J. BERG.
SLOT CLOSURE DEVICE.
APPLICATION FILED OCT. 20, 1915. RENEWED SEPT. 12, 1917.
1,247,208. Patented Nov. 20, 1917.
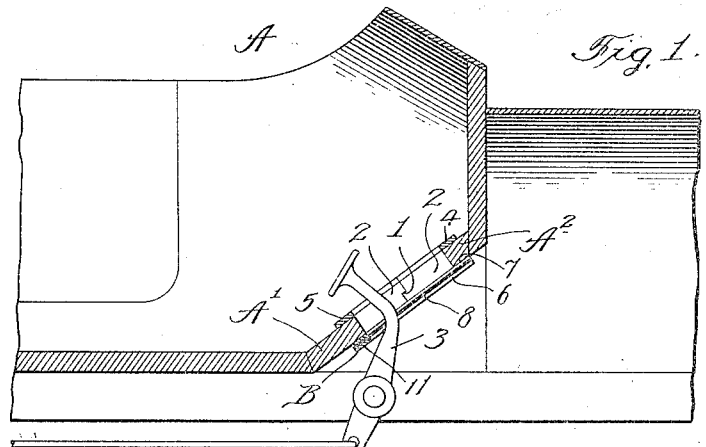
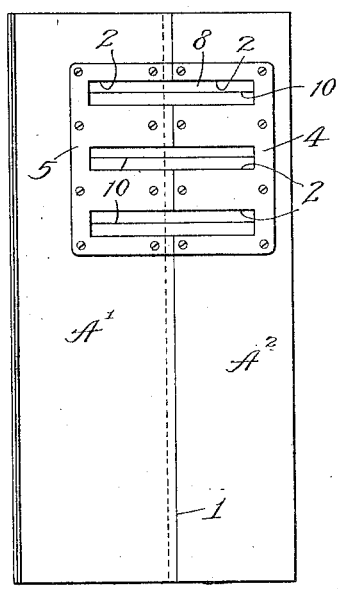
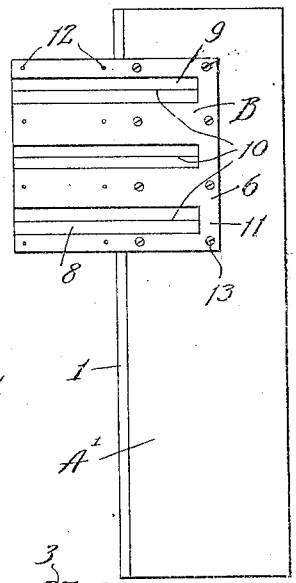
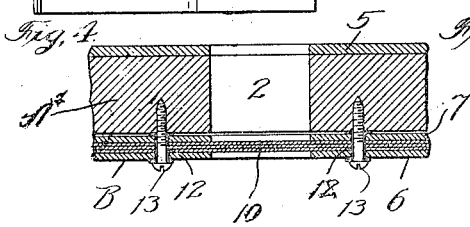
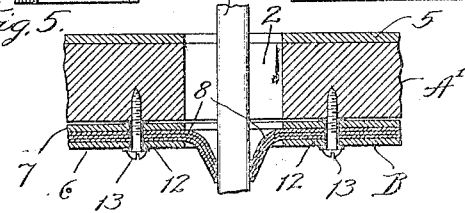
Inventor:
John Berg,

UNITED STATES PATENT OFFICE.

JOHN BERG, OF CHICAGO, ILLINOIS, ASSIGNOR TO METAL SPECIALTIES MANUFACTURING COMPANY, OF CHICAGO, ILLINOIS, A CORPORATION OF ILLINOIS.

SLOT-CLOSURE DEVICE.

1,247,208. Specification of Letters Patent. Patented Nov. 20, 1917.

Application filed October 20, 1915, Serial No. 56,925. Renewed September 12, 1917. Serial No. 191,064.

*To all whom it may concern:*

Be it known that I, JOHN BERG, a citizen of the United States, residing at Chicago, in the county of Cook and State of Illinois, have invented a new and useful Slot-Closure Device, of which the following is a specification.

The present invention is in the nature of an improvement upon the slot guard or shield disclosed in the patent to McCormack, No. 1,104,370, granted July 21, 1914; and the primary object is to provide a slot closure device of simplified and cheapened construction, which can be applied with great facility to the footboard of an automobile, and which will serve effectively to exclude the air which would otherwise enter the automo ''e body through the slots in which the foot levers of the automobile operate. The purpose is to exclude the heated air from the engine in summer time and the cold air in winter time, and to exclude the dust and dirt at all times.

The invention is illustrated in its preferred embodiment in the accompanying drawing, in which—

Figure 1 represents a broken vertical sectional view of an automobile body equipped with a slot closure device in accordance with my invention; Fig. 2, a plan view of the removable footboards provided at the front portion of the floor of the automobile body; Fig. 3, an inverted view of the footboards, showing the boards separated and the slot closure device applied to one of the boards; Fig. 4, an enlarged broken section taken as indicated at line 4 of Fig. 3; and Fig. 5, a similar section, but showing one of the treadles and illustrating the manner in which the flexible resilient members of the slot closure device are deflected from the closing plane, as the treadle moves in the slot of the footboard.

In the illustration given, A represents an automobile body having a bottom equipped at the front portion with removable footboards $A^1$, $A^2$, shown inclined in the usual manner.

The meeting edges of the boards are rabbeted, or provided with kerfs, in the usual manner, as indicated at 1; and the meeting edges of the boards are provided with the usual registering slots 2, in which the clutch-operating pedal and the brake-operating pedals 3 (one shown) operate. The footboards are also shown provided on their upper surfaces with binding plates 4 and 5, having slots which register with the slots 2.

One of the boards, preferably the lower or rear board $A^1$, is equipped with the improved slot closure device B. This comprises, in the preferred form, a pair of metal plates 6 and 7, and interposed sheets of flexible, resilient material, such as rubber sheets, 8. The plates 6 and 7 are provided with slots 9; and the rubber sheets 8 are provided with slits 10 which are disposed centrally of the slots 9. The slots 9 are open at one end, and are closed at the other end by metal portions 11. The slits 10 are open at the open ends of the slots 9.

The rubber sheets 8 are firmly secured between the metal plates or holders 6 and 7, as by means of eyelets 12.

The device B is preferably applied to the rear or lower board $A^1$ as by means of screws 13. The device B is so applied that about one-half of the device projects beyond the edge of the board $A^1$, the projecting portion being that which corresponds with the open end of the slots 9. When the footboards are in place, the slots 9 register with the slots 2 in both boards, and the resilient, flexible members 8 close the slots. The boards can be slipped into place in the usual manner, the pedals entering the open ends of the slots and deflecting the resilient rubber strips along the slits, as the pedals move through the slits, the rubber strips again closing beyond the pedals.

From the description given it will be understood that the improved slot closure, in the preferred form, comprises two stiff metal plates provided with a series of slots which are open at one end, and a slitted sheet of flexible, resilient material interposed between said plates, the slits being open at one end; and that the device is so applied to one of the footboards as to guard the slots thereof and project beyond the edge of said foot board a sufficient distance to guard the slots of the other footboard when the boards are in the assembled position.

The device is simple, cheap, and easily manufactured, as well as readily applied. Moreover, the improved construction provides a continuity of the walls of the flexible, resilient sheets which prevents the possibility of the pedals getting caught and injuring the resilient strips; and, furthermore, the improved device provides greater security against drafts entering the body of the car through the slots.

The foregoing detailed description has been given for clearness of understanding only, and no unnecessary limitation should be understood therefrom.

What I regard as new and desire to secure by Letters Patent is:

1. In a motor vehicle, the combination of a pair of removable footboards provided at adjacent edges with registering slots for a controlling lever, and a slot closure device comprising a stiff holder member applied to one of said boards and projecting beneath the other board, said holder member having a slot registering with the slots of the two boards, and open at one end, and flexible, resilient strips carried by said holder member and presenting an open-ended slit through which the lever may enter and in which the lever may work.

2. In means of the character set forth, the combination with a pair of removable footboards of an automobile body, which are provided at adjacent edges with series of registering slots in which the controlling levers of the machine may work, of a slot closure device comprising a pair of plates having slots open at one end, and interposed flexible, resilient strips presenting slits open at one end, said closure device having its portion in which are the closed ends of said slots secured to one of said boards and the other portion projecting beyond the edge of said board and adapted to guard the slots of the other board.

3. In means of the character set forth, the combination with a pair of removable footboards for an automobile, said boards having adjacent edges provided with registering slots, of a closure device comprising a stiff holder element provided with a series of slots which are open at one end, and a plurality of rubber sheets secured to said holder element and provided with slits disposed in the central planes of said slots and open at the corresponding end.

4. In means of the character set forth, the combination of a pair of stiff plates provided with a series of slots which are open at one end, and a plurality of rubber sheets secured between said plates and having slits which are open at one end, said slits registering with the central portions of said slots.

JOHN BERG.

In presence of—
  L. HELSLAR,
  K. O'NEILL.